US008959341B2

(12) United States Patent
Dismore et al.

(10) Patent No.: US 8,959,341 B2
(45) Date of Patent: Feb. 17, 2015

(54) METHODS AND SYSTEMS FOR SHARING DATABASE CONTENT

(75) Inventors: John Dismore, San Francisco, CA (US); Didier Prophete, San Francisco, CA (US); Wolfgang Mathurin, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 1049 days.

(21) Appl. No.: 12/693,258

(22) Filed: Jan. 25, 2010

(65) Prior Publication Data

US 2010/0223467 A1    Sep. 2, 2010

Related U.S. Application Data

(60) Provisional application No. 61/147,005, filed on Jan. 23, 2009.

(51) Int. Cl.
*G06F 17/30* (2006.01)
*G06Q 10/10* (2012.01)

(52) U.S. Cl.
CPC .......... *G06Q 10/10* (2013.01); *G06F 17/30893* (2013.01)
USPC ........................................... 713/168; 713/169

(58) Field of Classification Search
CPC ........................ G06Q 10/10; G06F 17/30893
USPC ................. 726/26, 27, 28, 29, 30, 31, 32, 33; 713/168, 169, 170, 171, 172; 709/206, 709/204, 201; 707/607, 608, 609; 380/1, 2, 380/200
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |
| 6,295,530 | B1 | 9/2001 | Ritchie et al. |

(Continued)

*Primary Examiner* — Brandon Hoffman
*Assistant Examiner* — Nega Woldemariam
(74) *Attorney, Agent, or Firm* — Ingrassia Fisher & Lorenz, P.C.

(57) ABSTRACT

Mechanisms and methods for sharing database content stored by a first organization with a third party are provided. A network address is provided to the third party, which can enable control of the access to the content and tracking of the views of the content. For example, the network address can include an encrypted key that contains information about the organization that created content and the specific distribution ID for delivering the content when requested by the third party using the address. A distribution can be created in numerous ways, with various restrictions on the access to the document of a distribution.

19 Claims, 10 Drawing Sheets

(56) References Cited

U.S. PATENT DOCUMENTS

| | | |
|---|---|---|
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0052783 A1* | 2/2008 | Levy ............................ 726/26 |
| 2010/0125511 A1* | 5/2010 | Jouret et al. .................. 705/27 |
| 2010/0185978 A1* | 7/2010 | Laurie et al. ................. 715/802 |

* cited by examiner

FIG. 4

Opportunity Detail

| | | | |
|---|---|---|---|
| Opportunity Owner | Kasey Central [Change] | Amount | $5,000.00 |
| Opportunity Name | United Partners* - 5K | Close Date | 1/22/2005 |
| Account Name | United Partners* | Stage | Closed Won |
| Type | Add-On Business | Probability (%) | 100% |
| | | Reason Lost | |
| Next Step | Discovery call scheduled for next week | | |
| Description | Potential big win for their decision maker | | |
| Campaign Source | Tradeshow - Network World - May 07 | Lead Source | Purchased List |
| Created By | Kasey Central, 9/13/2008 4:03 PM | Last Modified By | Bob Smith, 9/13/2008 4:03 PM |
| | | Opportunity Record Type | Sample [Change] |

— 410

Activity History

| Action | Subject | Name | Due Date | Assigned to | Last Modified Date/Time |
|---|---|---|---|---|---|
| Edit \| Del | Email: Upgrade Offer | | 7/30/2007 | Bob Smith | 9/13/2008 4:03 PM |

— 420

— 440

Related Content

| Action | Title | Created By | Created Date | Last Modified Date |
|---|---|---|---|---|
| Deliver \| Del | SSS – Borland ROI Case Study (Nucleus) | | 9/12/2008 1:58 PM | 9/12/2008 1:58 PM |
| Deliver \| Del | Fall 2009 Pricing | | 9/11/2008 10:20 AM | 9/11/2008 10:20 AM |

— 430

Delivered Content

| Action | Name | Created By | Created Date | Total Views | Last Viewed |
|---|---|---|---|---|---|
| View | Jane Smith - Content Pack Email | Bob Smith | 9/13/2008 | 15 | 9/28/2008 |

— 450

400

Distributions details screen

FIG. 7

Shared Content Details

▼ Content Link Details

710

| | | | |
|---|---|---|---|
| Name | Distribution name | Last Modified | Username MM/DD/YYY hh/mm |
| Description | ?? | Created By | UserName |
| Notification | ☑ | Version | Latest (version #) |
| Download | As PDF (None / Original File) | Expiry Date | MM/DD/YYY hh/mm |
| Link | http://.....salesforce.com/rxped28sa4gy2 | | |

▼ View Summary

720

| | | | |
|---|---|---|---|
| Total View Count | 3 | Average Duration | hh:mm:ss |
| First View Date | 09/23/2008 | Last View Date | 10/12/2008 |

▼ Document Details

730

| | |
|---|---|
| Document Name | Symantec Welcome |
| Decription | Keynote delivered by Pat Morissey at Symantec Sales Days Conferecnce |
| Author | Mandar Parikh |

Thumbnail Preview

▼ Related Records

740

| | | | |
|---|---|---|---|
| Record Type | Opportunity | Name | Symantec |
| Salesforce Contact | jane.smith@symantec.com | Last View Date | 10/12/2008 |

700

View details screen

Content View Details

| View Date | 10/12/2008 hh/mm | View Duration | hh/mm/ss |
|---|---|---|---|
| View Location | Cupertino | View Domain | Symantec.com |
| Type | External | | |

▼ Related Views

| Title | Document Type | View Duration |
|---|---|---|
| Content Product data sheet | PDF | hh:mm:ss |
| Salesforce Content Overview | PowerPoint | hh:mm:ss |
| Salesforce Content Demo | Video | hh:mm:ss |

Content View Details

| View Date | 10/12/2008 hh/mm | View Duration | hh/mm/ss |
|---|---|---|---|
| User | Gregg Johnson | Type | Internal |

▼ Related Views

| Title | Document Type | View Duration |
|---|---|---|
| Content Product data sheet | PDF | hh:mm:ss |
| Salesforce Content Overview | PowerPoint | hh:mm:ss |
| Salesforce Content Demo | Video | hh:mm:ss |

METHODS AND SYSTEMS FOR SHARING DATABASE CONTENT

CLAIM OF PRIORITY

The present application claims priority from and is a non-provisional application of U.S. Provisional Application No. 61/147,005, entitled "METHODS AND SYSTEMS FOR SHARING DATABASE CONTENT" filed Jan. 23, 2009, the entire contents of which are herein incorporated by reference for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to sharing data among business partners, and more particularly to sending documents to a third party via a multi-tenant database service.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In a conventional database, a first user of an organization can store and access documents, and other users of the organization can access the documents stored by the first user. However, to provide the document to people outside of the organization, the document is routinely copied to an e-mail and sent. Such a process provides limited functionality to both the sender and the receiver.

Accordingly, it is desirable to provide systems and methods for convenient and robust methods to allow external users to read documents on the database.

BRIEF SUMMARY

In accordance with embodiments, there are provided mechanisms and methods for sharing database content with a third party, which have advantages over sending attachments via email. The ability of embodiments to provide content via a network address can enable control of the access to the content and tracking of the views of the content.

In an embodiment and by way of example, one or more documents of a database are associated with a network address, which may be publicly accessible (e.g. a URL of a customizable web page). The network address can then be sent to a third party who does not have database access to the document. The third party can then access (e.g. view and/or download) the document via a network browser. The documents can be converted to a format for an in-browser view of the document, which can be played in any browser and on any operating system. The conversion can be done before sending the network address so that the third party can quickly view the converted document.

In one embodiment, each view and/or download of the document can be tracked, and reports and automated alerts of the viewing can be provided. In another embodiment, a user of the database can visually assemble packs of documents for external distribution or internal use, as well as visually search slides of presentations and assemble new presentations.

In various embodiments, the address can be made secure with a password, IP address restrictions, and by including an encrypted key in the address itself. Other security measures can include a specification of how long the third party has access to the document, and in what format.

In another embodiment and by way of example, a user can choose a file to deliver, e.g. by uploading a file from a computer or by choosing materials from a content managing application. The user can then configure delivery settings, e.g. by specifying whether to password-protect access to the document via a network address, receive alerts based on viewing activity, and other parameters. The user can preview and validate the content in a browser to verify the quality of the online version. The content delivery address can then be sent to a recipient via email, instant messaging, or other suitable medium.

While the present invention is described with reference to an embodiment in which techniques for sharing database content are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2®, by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers can indicate identical or functionally similar elements.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 4 shows a screen 400 illustrating different selection points for requesting delivery of content starting from other database records according to embodiments of the present invention.

FIG. 7 shows a distribution details screen 700 according to embodiments of the present invention.

FIG. 9 shows a view details screen 900 according to embodiments of the present invention.

DETAILED DESCRIPTION

I. General Overview

Systems and methods are provided for sharing database content with a third party. These techniques for sharing (distributing) database content with the third party can enable embodiments to provide additional functionality, such as universal access to a document regardless of document type, efficient access in instances where document is of a large size, control over access, and tracking of views of a document.

As used herein, the term multi-tenant database system refers to those systems in which various elements of hardware and software of the database system may be shared by one or more customers. For example, a given application server (e.g. running an application process) may simultaneously process requests for a great number of customers, and a given database table may store rows for a potentially much greater number of customers.

As used herein, the term "network browser" includes applications that are used to view and/or download documents that are associated with a network location. Examples include Internet Explorer, Mosaic, Firefox, and Chrome. As used herein, the term "publicly accessible" refers to an address of a server, where the sever can receive requests for content at the address from any computing device.

Next, mechanisms and methods for sharing database content will be described with reference to example embodiments.

II. System Overview

Figure 1:
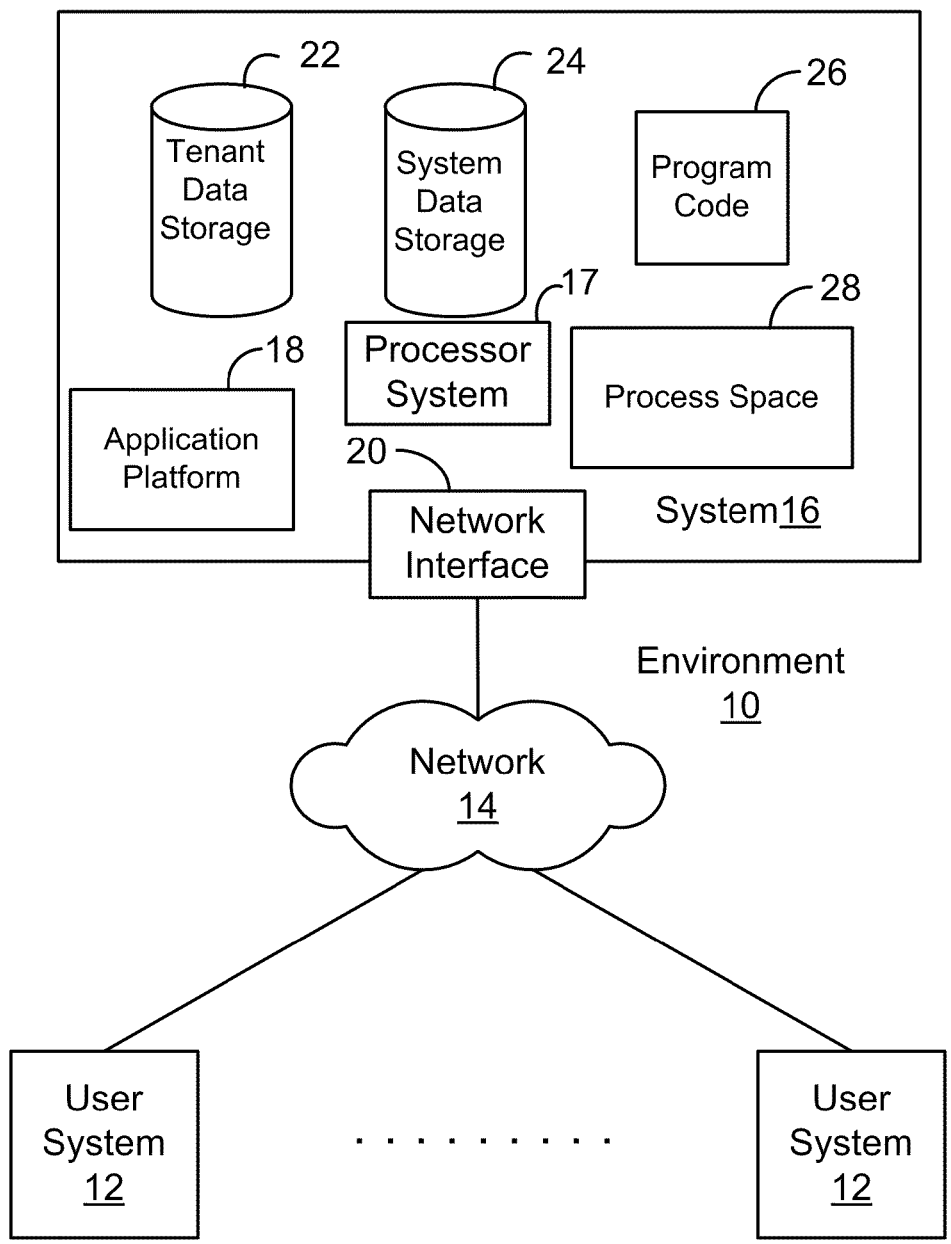
FIG. 1 illustrates a block diagram of an environment wherein an on-demand database service might be used.

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level. The permission levels determine sharing rules (access rights) for data in the database.

Regarding access rights, a private sharing feature or rules may allow groups defined within a particular tenant(s) to share information (e.g., objects, specific instances of objects, documents) only among members of that group provided in certain embodiments. Sharing rules are a way of granting access to a set of entities (the source), to a set of users (the target). In one aspect, the source set is a logical set of entities defined by picking a group. The source then contains all entities owned or with access rights by users in the group. In one embodiment, sharing rules can specify an access level for each entity.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications (application processes) as well as provide related data, code, forms, web pages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
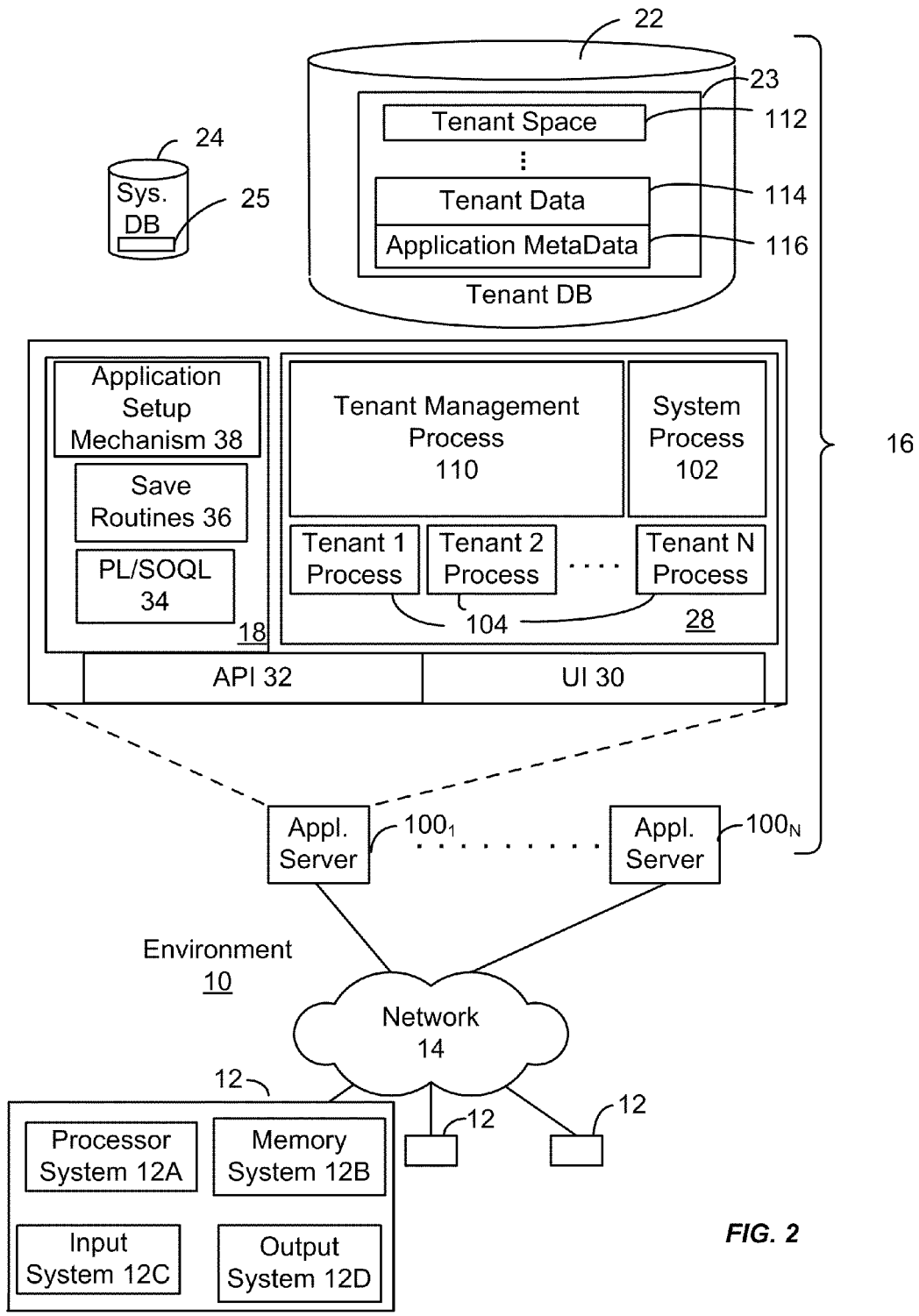
FIG. 2 illustrates a block diagram of an embodiment of elements of FIG. 1 and various possible interconnections between these elements according to an embodiment of the present invention.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

A table generally contains one or more data categories logically arranged as columns or fields in a viewable schema. Each row or record (e.g. an instance of an object) of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc.

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system.

III. Sharing Database Content

Systems and methods for sharing (also called delivering and distributing) of database content allow a third party who is not a subscriber (tenant) of a database system (e.g. system 16) to view documents stored on the database system. Additionally, a user of the database system can share the content with users of a different subscriber organization.

For example, embodiments allow users to upload documents like PDFs, Power Points and other file types and then share a publicly accessible address, e.g., a uniform resource identifier (URI) or locator (URL). In one embodiment, the content can be configured to be viewed through browser accessible player (e.g. a Flex-based player). In another embodiment, it will also be possible for users who access the public URL to download PDF renditions (versions) and/or the original content, depending on the delivery (distribution) configuration.

Figure 3:
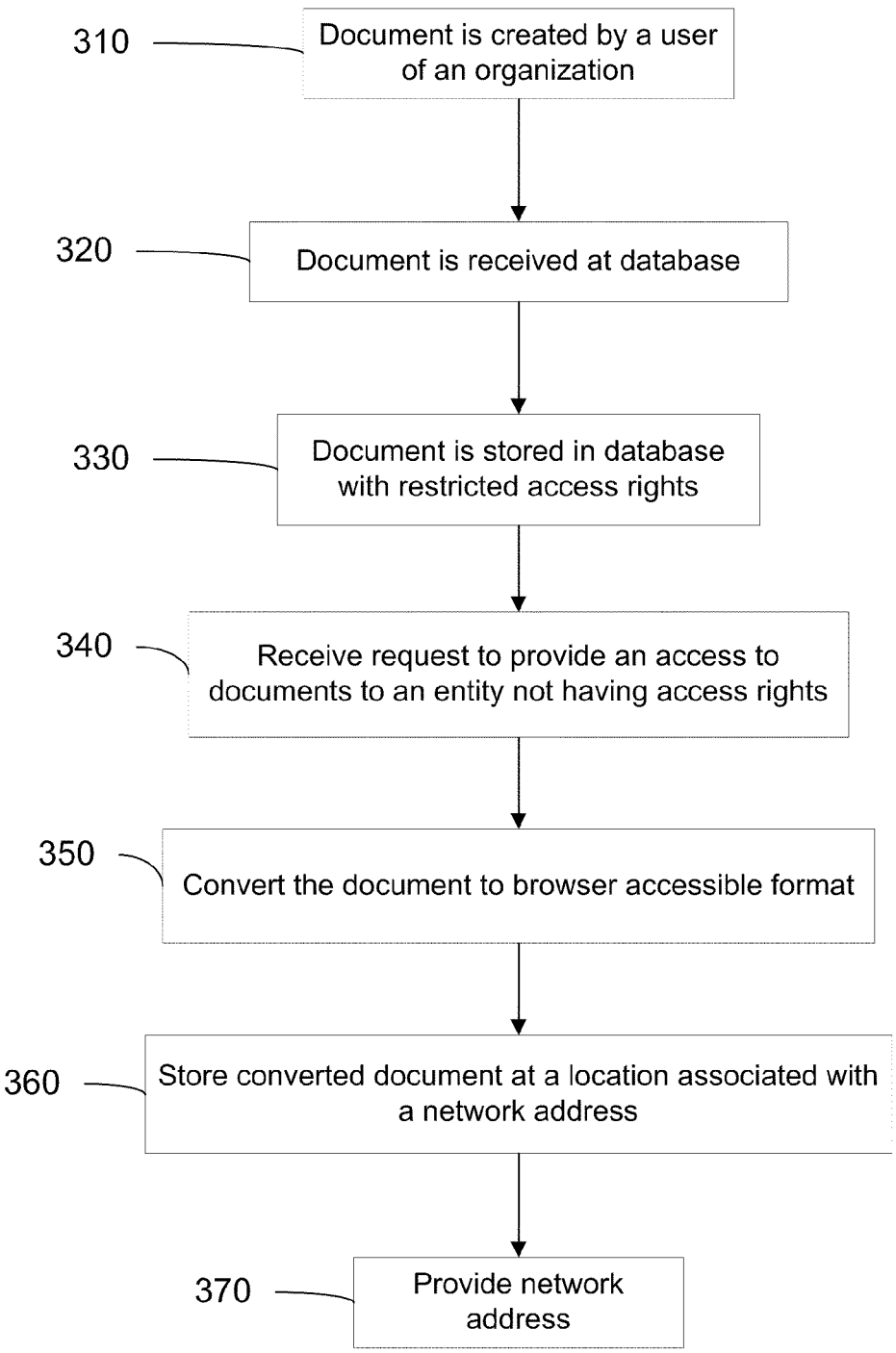
FIG. 3 is a flowchart illustrating a method 300 of sharing database content according to an embodiment of the present invention.

FIG. 3 is a flowchart illustrating a method 300 of sharing database content according to an embodiment of the present invention. An ability for users of an organization to share a document can be enabled by an administrator of the organization via an organization permission value. The permission value may be independent of a content exchange permission which is used to control access to a content managing application.

In step 310, a document is created by a user of a first organization that subscribes to an on-demand database service (e.g. as provided by system 16). The document may be created by any standard applications, such as Word, Acrobat, PowerPoint, etc. In one embodiment, the document may be created by combining documents, which may be of different formats and have been created from different applications. The documents can be combined with the content managing application.

In step 320, the document is received at the on-demand database system. In one embodiment, a user uploads a document e.g. a PowerPoint document. In another embodiment, the document is received from a database application that assembles a document from other documents already stored in the database system.

In step 330, the document is stored at a first location in a database of the database system. In one embodiment, access to this stored document is restricted according to sharing rules of the first organization and/or sharing rules of the database system. For example, users from other organizations may be restricted from viewing or retrieving the document. Also, within the first organization different users may not be able to view documents owned by another user. Users may also belong to particular groups, with certain groups having different access rights than the users of another group. In another embodiment, where the document was assembled from other documents, the assembled document itself may be stored, or instead a list of the separate documents may be stored, which effectively stores the assembled document.

In step 340, a user sends a request to provide an access to the document to an entity (also called third party) that does not have access rights to the stored document on the on-demand database system. For example, the entity may be a potential new client or an existing client (including employees of the client) with which the first organization is doing business. The entity may be an organization (or users of the organization) that does not subscribe to the on-demand database system or one that does subscribe, but does not have access to the document.

A user can also fill out the basic properties of the delivery of the document to the entity. For example, a password can be required, and an expiration (time or number of views) may be specified.

In step 350, the document is optionally converted to a format accessible by a network browser, as defined herein.

The conversion may be done at any time, e.g., when the document is first uploaded or created, or after a request to provide access is received. In one embodiment, the document may be converted to a shockwave flash (SWF) file, or other format, such as Silverlight or scalable vector graphics (SVG). Flash renditions (a flash version of the document) may be made for common document types (PDF, DOC, XLS and PPT). Thumbnail renditions may also be created, e.g., for the first page of common document types.

In other embodiments, the network browser can (or at least is assumed to be able to) interpret all types of files, or a user can be required to have certain plug-ins (applications that run in within the network browser). Thus, conversion is not necessary.

In step 360, the converted document is stored at a second location that is associated with (linked to) a network address, e.g., a publicly accessible URL. In an embodiment where conversion is not performed, the first location of the stored document can be associated with the network address. The association allows a server (e.g. application server 100) of the on-demand database service to retrieve the document (or converted document) when the third party entity provides a valid request (e.g. a request with a password or within the allotted time period).

In step 370, the network address is provided so that the entity may access the converted document. The network address may be provided to the user who provided the request to provide access. The user can then send the network address (e.g. as a link) to the entity via an e-mail, instant message, text message, phone call, or other suitable communication mechanism. The e-mail can be sent through the on-demand database service or via a separate application, such as one residing on a local client computer being used by the user.

IV. Administrative Setup and Starting of Delivery Process

In some embodiments, an administrator of an organization can enable whether or not distribution of a document is allowed for users of the organization. In one embodiment, this setting can be found at Setup>App Setup>Content Deliveries. As an example, the setting can be made by checking a box. A logo image for a browser page displayed when viewing a document for the organization can also be selected.

The administrator can select default parameters and hardcoded values for delivery parameters, for example, whether always need to have a password, or never allow a download. Delivery parameters are discussed in more detail later. The administrator can also specify that certain documents (e.g. ones in a certain workspace) cannot be distributed. A workspace can be used to group documents with similar sharing rules and other access rights.

In one embodiment, enabling the distribution feature can trigger the creation of a single guest user for the organization that is dedicated to public access of content. In one example, the guest user cannot be seen in the user administrator screens. This dedicated guest user can use the guest profile type and user license for the on-demand database service.

Once distributions are enabled, the on-demand database service for the organization can provide points for users to request delivery of content. In one embodiment, the selection points (e.g. buttons) are not provided on a screen unless distributions are enabled. In another embodiment, the selection points are provided, but an error message is provided when the points are selected.

There are various ways in which a user can start a process for delivering content. In one embodiment, the user can enter the request via an application, e.g. a wizard within a database application. As an example, two entry points to the wizard are from the document details page within a content manage, and from a couple of related lists on the detail page of records, such as opportunities, accounts, cases, leads, contacts, campaigns, and custom objects.

FIG. 4 shows a screen 400 illustrating different selection points for requesting delivery of content starting from other database records according to embodiments of the present invention. Screen 400 shows three examples of selection points on a detail page of a record. Specifically an opportunity record for an organization.

In one embodiment, an "Activity History" related list shows activities performed for the opportunity record. Each one of the activities shown may be its own record in the database. These activities are related to the opportunity record, and thus are shown on this detail page. The "Activity History" box has buttons for performing or describing activities, such as "Deliver Content" button 410.

In another embodiment, a "Related Content" list shows content documents that are related to the opportunity record. In one aspect, the content documents shown could have been uploaded into a content application, which can be used to manage content documents. When uploaded, the content documents may be put onto the related content list of the opportunity, e.g., by providing an attribute to either the content document or the opportunity record. A "Deliver Content" button 420 can be clicked to start the process of delivery.

In yet another embodiment, a "Delivered Content" list showing content that has previously been delivered also has a Deliver Content" button 430. Selecting deliver content buttons 410-430 causes a new screen or pop-up screen, where the user can find (e.g. by searching or browsing) and select (or upload) content to deliver.

In another embodiment, a specific content document can be delivered by selecting "Deliver" button 450. When button 450 is selected, the screen for selecting content is not provided since the selection and request to deliver content are provided in the same button. In other embodiments, the delivery can be started from a "Content Detail" page, which provides details for a specific content document. The delivery can also be started when saving a content document. In these two embodiments, the content document is automatically selected.

Figure 5:
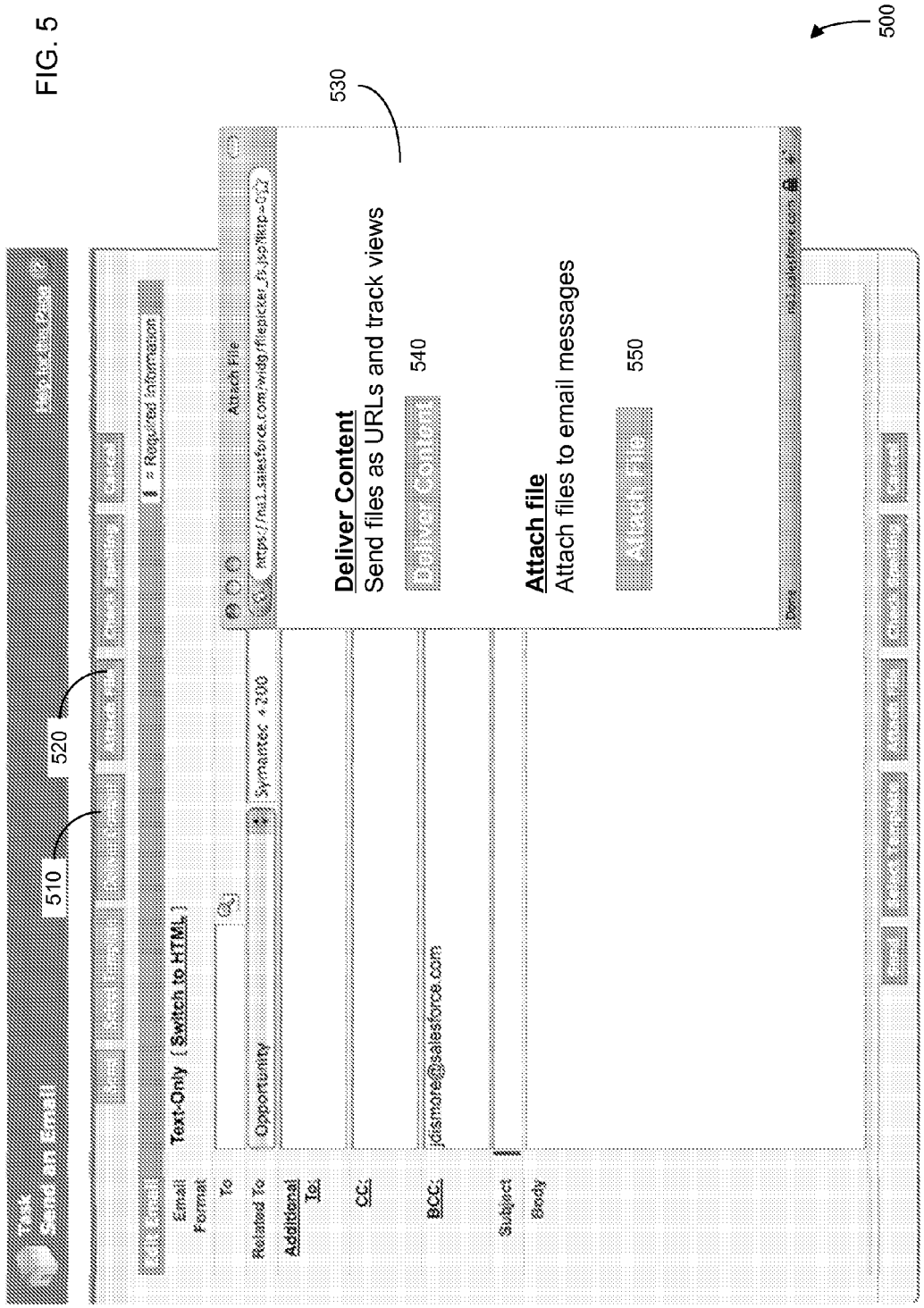
FIG. 5 shows a screen 500 illustrating different selection points for requesting delivery of content when sending an e-mail according to embodiments of the present invention.

FIG. 5 shows a screen 500 illustrating different selection points for requesting delivery of content when sending an e-mail according to embodiments of the present invention. Screen 500 may appear, for example, when "Send an Email" button 440 is selected from the activities box of screen 400.

The "Send an email" screen 500 shows a "Deliver Content" button 510, which can be selected to deliver content. Alternatively, a user can select "Attach File" button 520, which causes page 530 to pop up. The file can then be provided as an attachment using button 550 or as a link using deliver content button 540. These deliver content button 510 and 540 can function similarly as button 410-430. When selecting new documents, the page can provide list of content previously sent so that the user does not send the same content twice.

In an embodiment where a user searches for documents to be delivered, a user may search a database for documents matching certain criteria (such as words, owner, or other associated fields). A preview of the documents can be provided so that the user can ensure that the correct document and version is being selected for delivery.

In another embodiment, a user can combine selected documents to create a single document object (also called a pack). A combination of documents may be selected, and these documents may be put into a single object for delivery. The user can create the pack visually by selecting items in an order. The combined content then forms a single presentation for distribution. A thumbnail can be created for a first page of each document to allow the user to easily navigate the presentation and select certain parts of the presentation to view.

In yet another embodiment, after performing one or more searches, the user can optionally open up each matching document in a viewer, and then drag and drop selected pages into a new document. For example, a user could search for PowerPoint presentations containing reference to a particular client, e.g. XYZ corp. The user can then view the presentations and drag and drop selected slides into the new presentation.

In one embodiment, permissions can be set for a workspace as to whether a user can use content in that workspace for a pack or to distribute. Once the documents has been selected, the user can define distribution settings.

V. Formatting Delivery of Content

Figure 6:
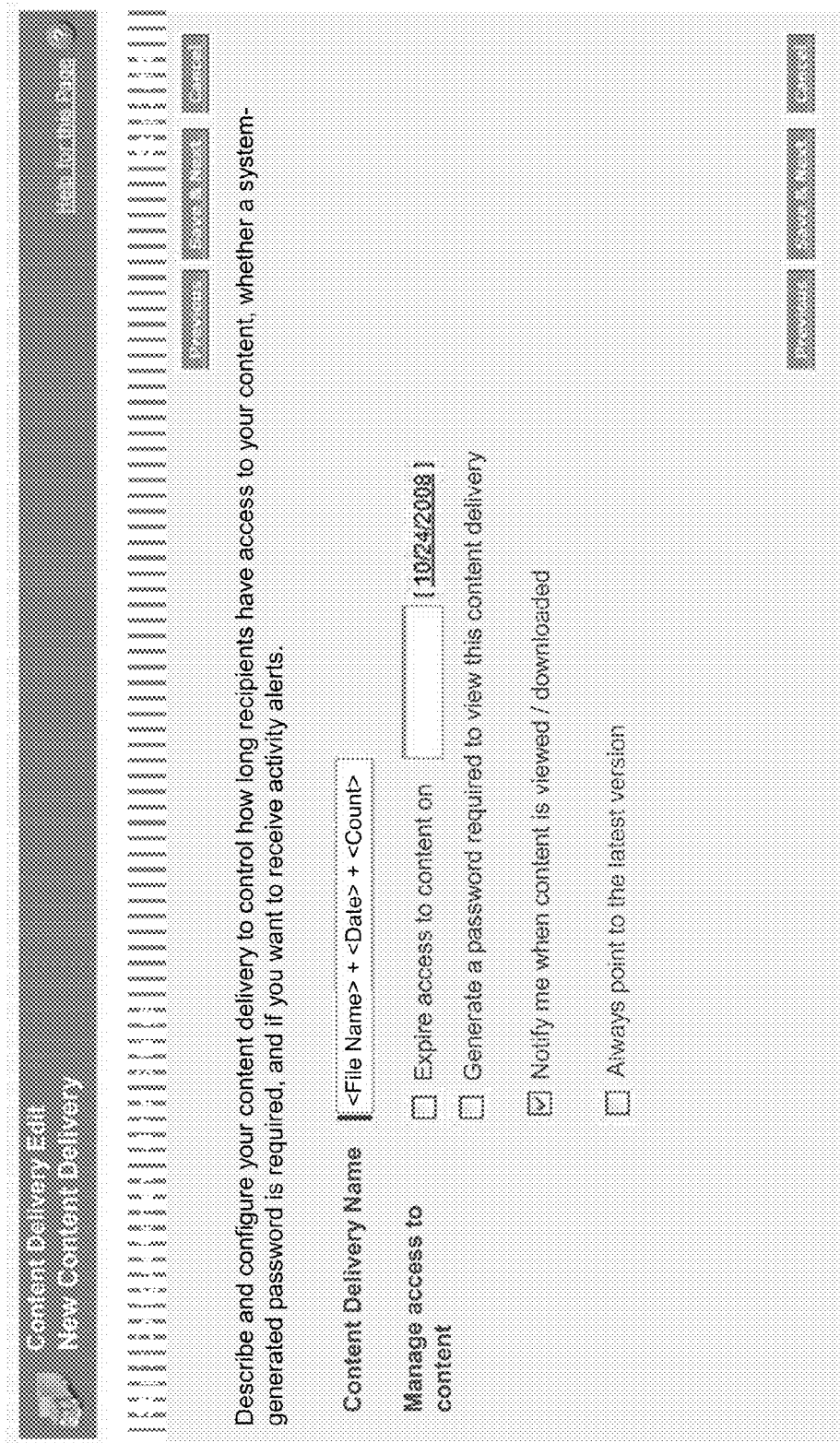
FIG. 6 shows a screen 600 for providing delivery settings for a distribution according to embodiments of the present invention.

FIG. 6 shows a screen 600 for providing delivery settings for a distribution according to embodiments of the present invention. As shown, screen 600 allows selecting the name of the delivery (distribution), expiration, whether to use a password, and notification of when the content is viewed or downloaded. A further option can be when and how the notification is sent, e.g., receive notifications for each view or as daily digest (default selected). A notification of a view can start a business process, such as automatic follow-up with person after person read it.

In the embodiment shown, a check box is used for selecting whether a feature or restriction is implemented. The name of the distribution can be pre-populated, e.g., title+current date+ (count if not unique) or filename+current date+(count if not unique). For example, the count could be used if multiple distributions are sent on the same date. In one embodiment, users will see the initial settings for the parameters (e.g. as defined by an administrator), after that the default values can be those from the users most recent distribution.

Regarding expiration, the embodiment shown receives input as whether the delivery will expire, and if so, on what date. In another embodiment, the expiration date could be entered as a duration of time, e.g., a number of days. After the expiration, an error message could be provided when a request for the document is made to the network address associated with the distribution. The default value for the expiration can depend on whether the user is a content user. A distribution can be manually terminated as well.

In one embodiment, a user can also specify whether the distribution is to always point to the latest version. For example, the user may want to ensure that the recipient only sees the version that was originally sent, and not any updates. Thus, a user can update the file before person views or they can view again. If the latest version is not to be provided, then the old version can be kept, and the URL can be kept associated with the old version.

In another embodiment, screen 600 or another screen can provide further options of whether the document is allowed to be viewed in browser, allowed to download in original format (e.g. to allow editing), and to allow to download as a PDF. Thus, the document can be restricted from downloading so the creator can prevent the recipient from resending and altering the document. If a delivery is flagged to allow downloads, one or more buttons can appear in the delivery player.

Other restrictions can include the domains that are allowed to view the document. In one embodiment, a user can specify certain domains (including top level domains such as .edu), intermediate domains (such ibm.com), or even an IP address of a specific computer. In another embodiment, a user can also restrict certain domains from having access to the document.

The input from screen 600 can be used to create a distribution object for this specific delivery of the content. This distribution object can store information used by the on-demand database service when a view request is received at the network address.

The distribution object can include information and settings regarding the document, such as document ID and version, including latest version and version at time of distribution. Viewer authorization settings can include information as to the types of access, such as browser view and/or download, with the download being by PDF or the original document. Distribution expiry settings can include expiry date and number of views. Notification settings can include whether notification is required. Distribution and view tracking information can include the distribution name, records that the distribution is related to (which may be the same as the records that the document is related to), and users that the distribution is related. In one embodiment, the document details are only available for users who can create content (content users).

Specific data fields of the content distribution object can include: organization_id, distribution_id, name, created_date, created_by, owner, last_update, last_update_by, system_modstamp, deleted, status, version_id, preferences1, who_id, what_id, passwd_plain, expiry_date, view_count, mean_duration_sec, first_view_date, and last_view_date. The four fields of view_count, mean_duration_sec, first_view_date, and last_view_date can be used for summary statistics.

The status field can capture the general state (e.g. with values of: in setup, shared, disabled). The version_id can point to a content version entity. The preferences1 value can control various user-configurable preferences (e.g. download, expiry). The who and what values can allow the delivery to be associated to who and what objects. Having two fields can allow building in who/what lookups in the delivery wizard. In one embodiment, if the delivery is configured to expire and once the expiry date has passed, the document can no longer be loaded and an error page will be displayed.

In some embodiments, the passwd_plain field is used to store an auto-generated password, which is required to access the one or more documents of the distribution. The distribution creator can communicate the address along with the password to the third party viewer who is to be allowed to view the document. In one aspect, the password can be visible in the distribution's detail page. In one embodiment, when the player at the server (e.g. a Flex player that is displayed in-browser) loads the distribution metadata, a hash of the password is sent to the player, which then compares this with a hash of what the third party viewer enters. If the values agree, then the distribution is played.

The content distribution (content deliveries) object may be editable. For example, a "content deliveries" related list can be added to the whos/whats that can be associated to it. In one embodiment, a user can navigate from a specific document within the content application to see the deliveries related to the document.

In one embodiment, the content deliveries object is added to the standard object permissions for a user's profile. Permission can control access at the object level. And, access to individual records with that object type can be controlled by the sharing model.

The "Related Content" list can be updated when a content delivery record is created. For example, when a document is distributed in the context of another record, the distribution should be added to the "Related Content" list. In one embodiment, the "Related Content" list uses the security model of the related record, e.g., if a user can see the opportunity then the user can see the distributions, and specifically the document.

The "Activities" can also be updated when a content delivery record is created. For example, a task named after the content deliver can be created and saved. A link to the content delivery detail screen can be provided for the added task.

In various embodiments, distribution objects and information regarding the views of the distribution can be seen from content search results, content details screen (e.g. accessed from 'delivered content' related list), distribution details screen (which can include a recent views related list), and other records (such as distribution related lists).

FIG. 7 shows a distribution details screen 700 according to embodiments of the present invention. As shown, section 710 shows detail information for the distribution, e.g. some of the information mentioned above. Section 720 shows a summary with some information about the views of the document. Additional information about the views may be obtained through buttons on this page or via other mechanisms. Section 730 provides information about the document that is being delivered in the distribution. Section 740 lists a record that is related to this distribution. Note the list can contain more than one related record.

After or as part of the creation of the distribution, a custom network address can be generated. The user can cut and paste the address into e-mail or other message. In another embodiment, a user can select a "send e-mail" item and the address can automatically be put into an e-mail. If a password is required, a password can be provided. A user can also populate related items within the e-mail.

In one embodiment, a delivery confirmation/preview page where the public URL for the new delivery is displayed once the address is available. How soon the address is available can be based on the content type and whether any renditions have been created. If the delivery is not ready at first, the page can update periodically to update the status. A notification can also be sent to the user when the address is ready. The publisher can click the URL to check that it sufficiently good quality for the intended target audience.

VI. Creation of Content Rendition

At any point, a conversion of the document (e.g. to SWF format) to a new rendition can be performed. For example, when a file is created a rendition can be generated at the time of creation, as opposed to generating the rendition when the document is to be distributed. Generating the rendition at this time also allows previewing internally. As one alternative, the conversion could be done at the time the third party requests to view the document, but generation at this time could cause a significant delay before the third party can view the document.

While performing a conversion as part of the format of a distribution, a waiting screen can be shown. An e-mail alert can be sent when rendition is ready. If a password setting has been chosen, the password can be provided for the preview. Also, the converted file can be stored in another location that is associated with the file stored at a first location.

In various embodiments, separate tools can be used to generate PDF, SWF and thumbnails, respectively. For example, one tool (e.g. OpenOffice) may be used for generating a PDF from XLS, DOC, and PPT files. Another tool (e.g. pdf2swf) may be used for generating SWF from the PDF.

A third tool (e.g. ImageMagick's convert) may be used for generating the thumbnails from the PDF. In one aspect, this convert tool can delegate the PDF to JPG conversion to GhostScript. A fourth tool (e.g. a java library, such as Aspose) may also be used to break presentations into slides and assemble new presentations from individual slides.

Renditions may be generated using different queues. A job queue and message queue are two queues that may be used. In one embodiment, there are at least three queues for renditions, and two more for breaking presentations into slides and assembling presentations from individual slides. A timer may be used when a generation of rendition is taking too long.

VII. Viewing the Content

Accessing the network address associated with the distribution (e.g. a public URL) can be considered an external viewing of the delivery. The distribution can also be viewed internally. For example, if a user is logged in to the organization where the delivery is created and clicks a link to the document, the link can provide an additional parameter to indicate that it is an internal viewing. In one embodiment, the URL visible in the navigation bar will look the same as the public external URL, so if the user happens to copy and paste the link to a customer, the link can never be accidentally considered as an internal viewing. Providing a distinction between an external view and an internal view can be an important feature for view tracking, as the creator of the delivery is typically only interested in external views. External viewing is no discussed in more detail.

In some embodiments, requests to the server (e.g. server 100) are newly authenticated or authenticated with an identity that has already been determined (e.g. via cookie). But the third parties accessing the document are not users of the on-demand database system (at least not users of the organization that created the document). In one embodiment, this problem is compounded in that the requests of the third party and the users can go the same server or group of users. To solve this problem, the server can recognize the guest request based on the address (e.g. a URL with specific values).

The URL can be created so that someone would not be able to (or at last small probability) guess it and gain access to a document. In one embodiment, the link (URL) includes an encrypted key, where most of the keys do not map to anything. When the link is decrypted, the key can convey which organization, and for that organization a table can be used to determine the distribution (documents plus any other information) for display.

An example URL format is as follows: instance.salesforce.com/sfc/play/?o=org_id&d=&delivery_id. For organizations that require secure connections enabled, the URL can be accessed via https. The organization ID, org_id (o), and the delivery_id (d) are parameters that can be pushed into the Flex player. As mentioned above, this pair of parameters can be encrypted into a single parameter. The delivery player or other server application can use the org_id and delivery_id to obtain the details of the delivery.

At this point, the delivery details can be checked to ensure that distribution is valid for the requesting entity (e.g. not expired or blocked for that IP address). The security features can be found in a table and indexed by org_id and delivery_id. Also, if the delivery_id cannot be found (e.g. it does not exist for the given org_id) the request may be deemed invalid.

In one embodiment, the delivery's public URL points to a lightweight launch page served by a content application. The content application embeds a small HTML/JS fragment that bootstraps Flash and instructs the launch page to load the delivery player and the SWF file. In one embodiment, the delivery player is a unified Flex player capable of rendering different types of content. The page can then render a HTML/JS fragment and inject flash variable parameters.

In various embodiments, the player can execute in the browser and run code to make asynchronous posts to load metadata and labels, encoded as JavaScript object notation (JSON) fragments, and to load the binary slide data (PNG/

JPEG renditions). When the player's code makes these posts, it can hit a distribution servlet, where no session will be available. In one embodiment, it is possible for the player to be launched from one domain then connect back to a different domain by installing a cross domain policy file in the site. The servlet URL may be: http://content.nal.content.force.com/sfc/dist So for example, when the player starts it makes an HTTP post to retrieve a JSON fragment to get initial data for the distribution. This will return JSON code to the player that wraps up the most vital metadata about the delivery. In one embodiment, all posts from the player contain three parameters: org id and delivery id to uniquely identify the context of the delivery, and a JavaScript Object Notation (JSON) encoded structure that wraps up any parameters required by the action being invoked.

Excluding error cases, this servlet can: extract the org id and perform a lookup to find the guest user dedicated to distributions; establish a user context as that user id; load the content distribution entity associated with the delivery id passed in the request; and validate that the delivery is valid. If the delivery is valid, the servlet can invoke a controller framework to decode the JSON message and instantiate an action implementation to do whatever is required.

In one embodiment, once the player has loaded metadata, the player can bulk load the slide images for the current delivery. To do this, the player can submit a message to invoke a version rendition download action, which passes a list of the rendition ids the player wants to retrieve. The response can be an uncompressed zipstream. For performance reasons, the initial load may also request just a single slide.

In another embodiment, the third party must request each page of the document. Each page that is requested sends a new request to the server and that page is provided in the browser. An advantage is that the document can be viewed sooner, as the whole document does not need to be downloaded. Also, each page can be tracked (e.g., when viewed and for how long).

Before showing a document, the player can provide a preview, especially when the document is composed of many subdocuments (e.g. in the case of pack). For example, the player can show thumbnails for each document that is part of the pack. The user can select a subdocument of the pack, and then slides (pages) of the selected document (and potentially following documents) can be presented.

Basic validity checks may also be performed at this stage or in addition to previous validity checks. For example, whenever the distribution entity is loaded, basic validity checks may be performed, such as: has the distribution expired?; are the distribution's slides rendered yet, or still in progress?; do the distributions preferences bits allow the user to view the slides?; do the distribution preferences bits allow the user to download the content as a PDF rendition?; and do the distribution preferences bits allow the user to download the "original" content? The player may also use this information to display appropriate controls.

In one embodiment, at no stage does a cookie need to be sent from the third party to the browser. Thus, there is no "guest user session" needed. In another embodiment, the action called by the player to initialize can also capture a view record against the delivery. An internal/external flag (e.g. injected into the player at the start) can be used to determine when a view record is captured. This feature can enable the publishers of a document to distinguish internal and external visits.

Regarding security and authorization, the distribution servlet can be configured to permit execution of only a narrow subset of the functionality of a piece of content, e.g. just viewing of the actual pages of the content (i.e. no metadata and fields of the content object). In one embodiment, the who/whats associated with the delivery are not be accessible through the player as these associations are intended only for internal use by the organization.

In another embodiment, content's security is controlled by an authorization service interface. This exposes many methods that guard basic functionality e.g. documentread( ) is a way to check if a user is permitted to view a particular document. This interface may be augmented for deliveries, e.g. to ensure that the ids are valid. In one embodiment, the distribution context may be cached, depending on how heavy these security checks are.

To ensure that external requests for a distribution do not overload the on-demand database service, a rate limiting framework can be integrated as a means to control effort expended for requests. In one embodiment, this framework guards the player, URI, and the distribution servlet. For example, the number of accesses to any one of these for a specific distribution, a specific document, or for an entire organization may be restricted. The revocation of a distribution after a certain number of views can also help to rate limit. In one embodiment, flagging an overloaded delivery URL in cached may be done. This could be checked quickly each time the player URL is hit to determine whether or not to serve the initial player page.

VIII. View Tracking

To perform view tracking in one embodiment, when the deliver player launches and hits the server for the first time, the player loads metadata about the delivery. In this initialization logic, a view record can be captured, e.g., as a dedicated table. The tracking is saved in a table keyed by a distribution ID. Each file can have multiple distributions (e.g. one for each third party), and each distribution can have multiple views (instances where the document was viewed). As mentioned above, information about the views may be obtained from a distribution details screen (e.g. screen 700). Additional information can also be obtained.

Figure 8:
FIG. 8 shows a view summary screen 800 that shows a list of external and internal views for a distribution according to embodiments of the present invention.

FIG. 8 shows a view summary screen 800 that shows a list of external and internal views for a distribution according to embodiments of the present invention. In this example, internal and external views are tracked. Information about the distribution can be found in the top section 810 and specific information about the views of the content can be found in bottom section 820. The "View details" button 830 can be selected to provide additional information.

FIG. 9 shows a view details screen 900 according to embodiments of the present invention. Screen 900 can show information about a view record. The record can have one or more of the following fields: organization_id, distribution_view_id, distribution_id, document_id, created_date, child_id, created_by, deleted, source_ip, system_modstamp, is_internal, view date & time, view duration, and parent doc ID In embodiments with a child_id, the child_id field can contain the ID of a content version and represents a child document that may have been opened by the user if the top level document in the delivery was a document pack. In one aspect, by default it can be an empty key. This construction can make it possible to distinguish views against a document within a pack. In one embodiment, the view count field on the parent distribution may be incremented when a child count is incremented. This may be done synchronously or by a summary process.

The is_internal boolean can be based on the internal view flag which may have been set when the player was launched as outlined above. This variable can track whether the view was internal or external. In various embodiments, internal views can occur from a view action on the distribution related list of the document details page, a view action on the distribution related list of other Salesforce records (accounts, opportunities etc), a preview launched when setting up a distribution, and the distribution link in the email body of an a Email activity In one embodiment, per-slide views can be captured too. For example, as each view of a page can require a separate request, the time spent on a page and the number of times that page is requested can be captured. If there are concerns over the volume of data to be captured, such a feature can be disabled.

Figure 10:
FIG. 10 a report screen 1000 that can be used to generate reports about a distribution and the views of a distribution according to embodiments of the present invention.

The total number of accesses can be tracked as a sum of one or more of: distribution count; user view count; external view count; total view count; and external downloads. These metrics for user views can be relevant as an indicator of document popularity or relevance FIG. 10 a report screen 1000 that can be used to generate reports about a distribution and the views of a distribution according to embodiments of the present invention. For example, report 1010 can provide view reports about most content views and most content views by source (internal vs. external).

Reports on certain records can also be performed, such as related records with views in the last X days, related records with active distributions, related records with distributions expiring/expired in the next/last X days, and documents that were distributed and viewed related to records with a status of won/lost.

From a users dashboard components or from a workspace view, other reports and information may be obtained. For example, one can obtain information about: most distributed docs; most viewed docs; my recent distributions; recent views of my distributions; recent distributions on related records the user has access to; and recent views of distributions on related records the user has access to.

In summary, embodiments can allow users to select content items (e.g. by going into a content database), bundle the desired items (such as a PDF white paper or short film), and publish them to a public Web site. Prospective client can be sent a link to the site, an approach that can get marketing messages past company firewalls, which may block emails containing big files. A user can customize the delivery so that recipients can view documents they receive online in their browser or download them to their computers in either the original file format or as a PDF.

Traffic on the public site can be captured by the on-demand database system, revealing, for example, the number of hits on a given document and how recently the document was viewed. Such tracking can enable uses (e.g. salespeople) to detect which marketing materials were most successful.

It should be understood that embodiments of the present invention as described above can be implemented in the form of control logic using hardware and/or using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive or an entire computer system), and may be present on or within different computer program products within a system or network. A computer system may include a monitor, printer, or other suitable display for providing any of the results mentioned herein to a user.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of sharing database content, the method comprising:
receiving, by an on-demand database system, receiving a document from a user associated with an organization;
storing the document at a first location in a database of the on-demand database system, wherein only specified users of the on-demand database system have access rights to access the document stored at the first location in the database of the on-demand database system;
receiving a request to provide an access to the document to an entity that does not have access rights to the document stored at the first location from one of the specified users of the on-demand database system;
generating, in response to receiving the request, a network address;
associating the document with the generated network address such that the document is accessible by the entity via a request to the network address;
providing the network address to allow the entity to access the document;
providing, by the on-demand database system, an input mechanism for the user to specify one or more parameters regarding the access to the document; and
storing the parameters in a table that is associated with an identifier that is part of the network address.

2. The method of claim 1, wherein the document is a combination of multiple files.

3. The method of claim 1, wherein the parameters include one or more selected from the group of: a date the access expires; a number of views before the access expires; whether the document can be downloaded, viewed, or both; what format the document can be downloaded; and whether to notify the user when content is viewed or downloaded.

4. The method of claim 1, further comprising:
creating a distribution object in the database, the distribution object including:
an identification associated with the request, and
the parameters, wherein the distribution object appears as a related object to the document.

5. The method of claim 1, further comprising:
converting the document to a format accessible by a network browser.

6. The method of claim 5, further comprising:
storing the converted document at a second location in the database, wherein the network address is linked to the second location.

7. The method of claim 6, further comprising:
the on-demand database system receiving, at the network address, a request from the entity to view the document; and
providing the converted document for display within the network browser.

8. The method of claim 1, further comprising:
the on-demand database system receiving, at the network address, a request from the entity to view the document;
providing the document for display within the network browser; and
the on-demand database system tracking one or more parameters related to the request from the entity.

9. The method of claim 8, wherein the parameters include one or more selected from the group of: a time when the request was made, a first number of how many requests have been made by the entity, a second number of how many requests have been made by any entity, and a duration of viewing of each page of the document during a request.

10. The method of claim 8, further comprising:
tracking requests to view the document from other users of the organization, wherein the internal and external views are differentiated.

11. The method of claim 1, wherein the network address is publicly accessible.

12. The method of claim 11, wherein providing the network address to allow the entity to access the document includes sending a password that is required to access the document via the network address.

13. The method of claim 11, wherein the network address includes an encrypted key, the method further comprising:
a server of the on-demand database system interpreting the encrypted key to correspond to a request for a document as opposed to a request to login into the on-demand database system.

14. The method of claim 13, wherein the encrypted key includes a first identification corresponding to the first organization and a second identification that identifies a request object that corresponds to the request, wherein the request object further identifies the document to be shared.

15. The method of claim 1, wherein the document is not associated with the network address until the request is received.

16. The method of claim 15, wherein the providing further comprises emailing the network address to the entity.

17. A non-transitory computer program product comprising a tangible computer readable medium storing a plurality of instructions for controlling one or more processors of an on-demand database system to perform an operation for sharing database content, the instructions comprising:
receiving, by the on-demand database system, receiving a document from a user associated with an organization;
storing the document at a first location in a database of the on-demand database system, wherein only specified users of the on-demand database system have access rights to access the document stored at the first location in the database of the on-demand database system;
receiving a request to provide an access to the document to an entity that does not have access rights to the document stored at the first location from one of the specified users of the on-demand database system;
generating, in response to receiving the request, a network address and associating the network address with the document such that the document is accessible to the entity via a request to the network address;
providing the network address to allow the entity to access the document;
providing, by the on-demand database system, an input mechanism for the user to specify one or more parameters regarding the access to the document; and
storing the parameters in a table that is associated with an identifier that is part of the network address.

18. An on-demand database system comprising:
a database that stores database objects for a plurality of organizations; and
one or more processors configured to:
receive a document from a user associated with an organization;
store the document at a first location in a database of the on-demand database system, wherein only specified users of the on-demand database system have access rights to access the document stored at the first location in the database of the on-demand database system;
receive a request to provide an access to the document to an entity that does not have access rights to the document stored at the first location from one of the specified users of the on-demand database system;
generating, in response to receiving the request, a network address and associating the document with the network address such that the document is accessible by the entity via a request to the network address;
provide the network address to allow the entity to access the document;
provide an input mechanism for the user to specify one or more parameters regarding the access to the document; and
store the parameters in a table that is associated with an identifier that is part of the network address.

19. The on-demand database system of claim 18, wherein the document is not associated with the network address until the request is received.

* * * * *